United States Patent
Sproles et al.

(10) Patent No.: US 8,589,307 B2
(45) Date of Patent: Nov. 19, 2013

(54) ECOMMERCE SYSTEM WITH PAYMENT DATA DIVISION

(71) Applicant: Volusion, Inc., Austin, TX (US)

(72) Inventors: Kevin Sproles, Austin, TX (US); Jason Wallis, Round Rock, TX (US); Jason Woosley, Austin, TX (US)

(73) Assignee: Volusion, Inc., Austin, TX (US)

( * ) Notice: Subject to any disclaimer, the term of this patent is extended or adjusted under 35 U.S.C. 154(b) by 0 days.

(21) Appl. No.: 13/737,476

(22) Filed: Jan. 9, 2013

(65) Prior Publication Data

US 2013/0124418 A1     May 16, 2013

Related U.S. Application Data

(63) Continuation of application No. 13/558,198, filed on Jul. 25, 2012.

(60) Provisional application No. 61/526,971, filed on Aug. 24, 2011.

(51) Int. Cl.
   *G06Q 20/00*     (2012.01)
(52) U.S. Cl.
   USPC ............ 705/79; 705/64; 705/75; 705/76; 705/77

(58) Field of Classification Search
   USPC ............................. 705/39, 64–79
   See application file for complete search history.

(56) References Cited

U.S. PATENT DOCUMENTS

| | | | | |
|---|---|---|---|---|
| 5,878,141 | A  * | 3/1999 | Daly et al. | 705/78 |
| 6,286,098 | B1 * | 9/2001 | Wenig et al. | 713/151 |
| 6,938,022 | B1 * | 8/2005 | Singhal | 705/74 |

* cited by examiner

*Primary Examiner* — Tsan-Yu J Huang
(74) *Attorney, Agent, or Firm* — Conley Rose, P.C.; Stewart Mesher; Grant Rodolph

(57) ABSTRACT

In at least one embodiment of an ecommerce system, payment data is divided into proper subsets and distributed among multiple data processing systems, and each of the data processing systems stores less than all of the subsets of the payment data after the subsets of payment data are distributed and until at least sending the payment data to a payment authorization system for processing. In at least one embodiment, distributing proper subsets of the payment data among multiple data processing systems enhances security of the payment data by limiting an amount of time and the locations in which a complete set of payment data is persisted.

18 Claims, 10 Drawing Sheets

FIGURE 1 *(prior art)*

ECOMMERCE SYSTEM WITH PAYMENT DATA DIVISION

CROSS-REFERENCE TO RELATED APPLICATION

The present application is a continuation application of U.S. application Ser. No. 13/558,198 filed Jul. 25, 2012 which claims priority to U.S. Provisional Patent Application No. 61/526,971 filed on Aug. 24, 2011, both of which are incorporated herein by reference in their entirety.

BACKGROUND

The present disclosure relates in general to the field of data processing, and more specifically to a method and system for dividing payment data.

DESCRIPTION OF THE RELATED ART

Many customers and merchants transact business via an electronic network, such as the Internet. Most transactions involving the Internet ("on-line transactions") involve some form of payment and often involve payment via a payment mechanism, such as a credit card or electronic checking, that involves payment data electronically sent by the customer and stored by the merchant or a third party.

Payment data represents data that can be used to pay for a commercial transaction. Exemplary payment data for a credit card holder (also referred to as a "cardholder") includes a cardholder name, a cardholder billing address, a credit card number, credit card security code, credit card expiration month, and credit card expiration year. Other payment data can include a credit card issue month and a card issue year. Misappropriation of payment data can result in credit card fraud, substantial financial loss, credit rating injuries, and other undesirable consequences to both the customer and the merchant.

Organizations have established standards to provide security in the exchange of sensitive information such as payment data. For example, for credit card transactions, the Payment Card Industry Security Standards Council (PCI SSC) established a payment card industry data security standard (PCI DSS) to provide an information security standard for organizations that handle credit card holder information for many debit, credit, prepaid, e-purse, automated teller machine (ATM), and point of sale (POS) cards. The PCI DSS standard is intended to increase controls around cardholder data to enhance payment card data security and, thus, for example, reduce credit card fraud and provide consumer confidence in engaging in credit card transactions, particularly on-line credit card transactions.

FIG. 1 depicts an exemplary ecommerce system 100 having a PCI DSS compliant merchant server system 106. The ecommerce system 100 includes a client computer system 102 that engages in ecommerce activity with the merchant server system 106. In at least one embodiment, the client computer system 102 is a computer system that includes a web browser software application 104 to allow a user of the client computer system 102 to receive and transmit data via the Internet. Examples of web browser 104 are Internet Explorer available from Microsoft Corporation of Washington, US and Firefox available from Mozilla of California, US. The client computer system 102 via web browser 104 allows a user of the client computer system 102 to browse web pages 108 provided by and interact with the merchant server system 106 via a network, such as the Internet or a private network.

To capture payment data from the user, the web browser 104 presents a payment form to the user, and the user enters payment data into the form. The web browser 104 captures the payment data in the form and provides the payment data 110 to the merchant server system 106. Generally the payment data 110 is encrypted and provided via a secure connection, such as via a secure sockets layer. Providing the payment data 110 can be in response to a request to purchase one or more products and/or services offered by the merchant server system 106 or can be in anticipation of a future purchase. The merchant server system 106 stores the payment data 110 along with a user identification code to associate the user with the user's payment data 110.

To authorize payment from the user to the merchant, the merchant server system 106 sends the payment data, merchant data, and a payment authorization request 112 to a payment authorization system 116. The payment authorization system 116 then provides a payment authorization response 118 to the merchant server system 106. The payment authorization response 118 can indicate approval or denial of payment. The payment authorization system 116 can be any system that provides payment authorization services and, in at least one embodiment, includes a payment gateway and a card association. Companies such as Authorize.Net with offices in Mountain View, Calif., Skipjack Financial Services in Cincinnati, OH, Sage Pay, London, England offer payment gateway services. Companies such as Visa, MasterCard, American Express, and Discover Card offer card association services.

Typically, to be authorized to conduct credit card payment transactions, the merchant server system 106 complies with the PCI DSS. Compliance with PCI DSS can be relatively expensive in terms of, for example, an investment in secure facilities, secure hardware and software, encryption technology, and compliance verification. However, merchant compliance with PCI DSS has been considered as a reasonable way to protect payment data from misappropriation and provide consumer confidence in providing payment data via a public network, such as the Internet.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In at least one embodiment of an ecommerce system, payment data is divided into proper subsets and distributed among multiple data processing systems, and each of the data processing systems stores less than all of the subsets of the payment data after the subsets of payment data are distributed and until at least sending the payment data to a payment authorization system for processing. In at least one embodiment, distributing proper subsets of the payment data among multiple data processing systems enhances security of the payment data by limiting an amount of time and the locations in which a complete set of payment data is persisted.

Furthermore, in at least one embodiment, dividing the payment data into proper subsets and distributing the subsets among multiple data processing systems facilitates a number of ecommerce system configurations that can, in at least one embodiment, not only enhance payment data security, but can also allow merchants to accept electronic payment without the merchant server system coming within the scope of information security standards such as the payment card industry data security standard (PCI DSS). If a data processing system does not fall within the scope of the information security standard, the data processing system does not need to incur the expense of complying with the standard.

Figure 2:
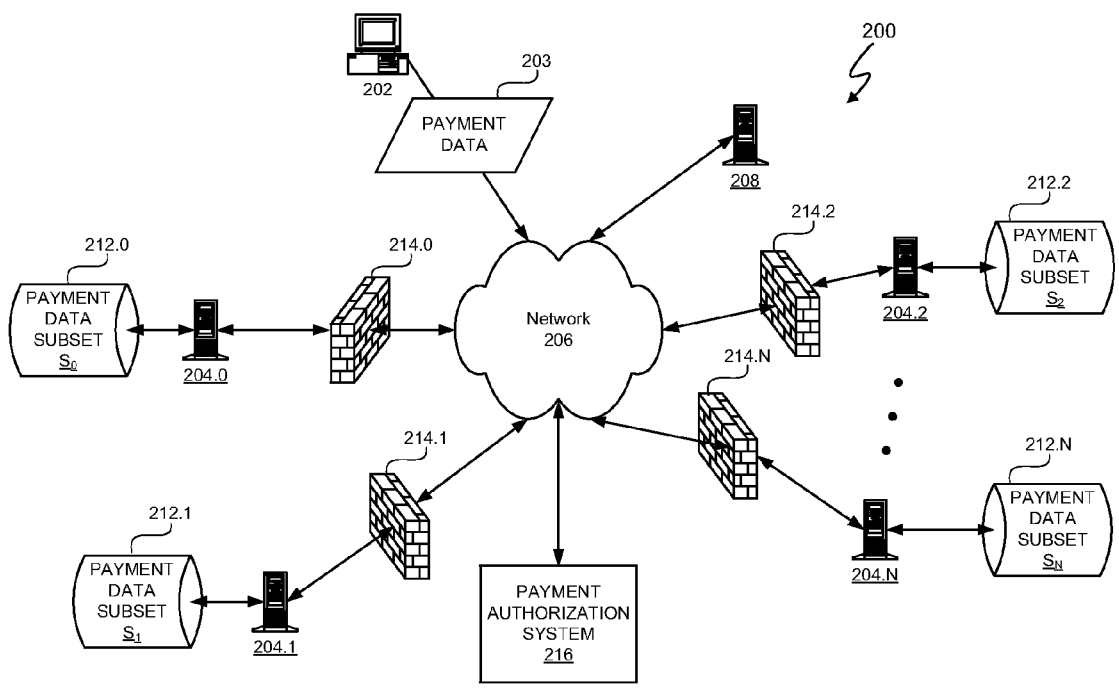
FIG. 2 depicts an ecommerce system having for dividing payment data.

As shown in FIG. 2, ecommerce system 200 includes a client computer system 202 that engages in an ecommerce transaction with a merchant data processinv, system 204 via the network 206. In at least one embodiment, the ecommerce system 200 divides payment data into proper payment data subsets to, for example, enhance security and minimize the number of data processing systems that fall within the scope of PCI DSS requirements. Additionally, the ecommerce system 200 can be configured in any of a number of ways to divide and combine the payment data.

The network 206 can be any type of network, such as the Internet. In at least one embodiment, the client computer system 202 is a computer system that includes a web browser software application (not shown) such as the web browser application 104 (FIG. 1) to allow a user of the client computer system 202 to receive and transmit data with a merchant data processing system via the network 206. The merchant data processing system is, in at least one embodiment, one of the data processing systems 204.0-204.N or can be another data processing system such data processing system 208. The network 206 can be any type of network such as, for example, the Internet.

The data processing systems 204.0-204.N are each part of a separate network in that, for example, each data processing system 204.0-204.N has independent and distinct access requirements. In at least one embodiment, firewalls 214.0-214.N. Firewalls 214.0-214.N permit or deny network transmissions to data processing systems 204.0-204.N based upon a set of rules to, for example, protect the data processing systems 204.0-204.N from unauthorized access while permitting legitimate data to pass. Generally the payment data 203 is encrypted and transmitted via a secure connection, such as via a secure sockets layer. Providing the payment data 203 can be in response to a request to purchase one or more products and/or services offered by one of the data processing systems 204.X or data processing system 208.

The ecommerce system 200 can be configured in any number of ways to divide payment data into proper subsets of data. For example, in at least one embodiment, the client computer system 202 sends payment data 203 through the network 206, and N+1 data processing systems 204.0-204.N each store respective proper payment data subsets S0-SN of the payment data. A "proper subset" is a subset that contains less than all elements of a set. In mathematical terms, if A is a subset of S and A≠S, then A is called a proper subset of S. "N" is an integer that is greater than or equal to 1. (Although four (4) data processing systems 204.X are actually depicted in FIG. 2, the number of data processing systems can range from 2 to N. "X" represents the ith data processing system, and i is an element of the set $\{0, \ldots, N\}$). In at least one embodiment, the client computer system 202 divides the payment data 208 into the proper payment data subsets S0-SN, and the payment data 203 represents the proper payment data subsets S0-SN. In at least one embodiment, the payment data 203 is a complete set, and one of the data processing systems 204.X, such as data processing system 204.0, divides the aggregate payment data 203 into the proper payment data subsets S0-SN. Data processing systems 204.0-204.N store the respective proper payment data subsets S0-SN in respective memories 212.0-212.N.

Figure 1:
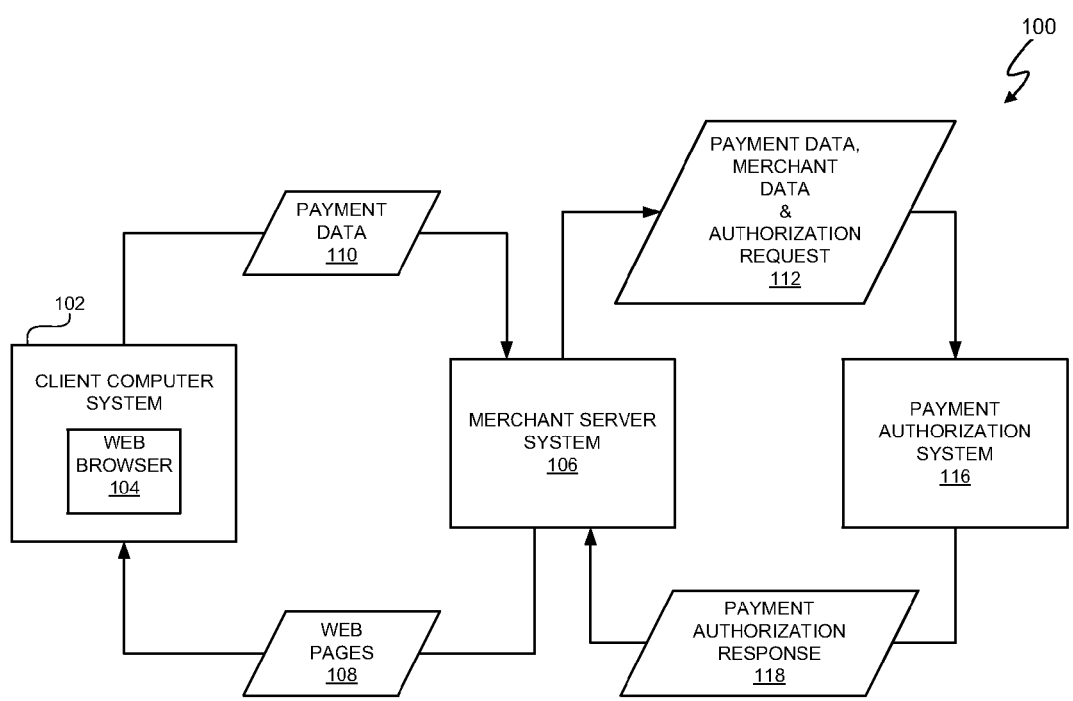
FIG. 1 depicts an ecommerce system having a PCI DSS compliant merchant server system.

The ecommerce system 200 can also be configured in multiple ways to combine the payment data and obtain a payment authorization response. In at least one embodiment, to request payment authorization, the data processing system 204.X or 208 functioning as a merchant data processing system requests at least one of the other data processing systems 204.0-204.N to proceed with payment authorization. In at least one embodiment, when a single data processing system 204.X receives the payment authorization request, the data processing system 204.X receives all of the payment data subsets S0-SN, combines the payment data subsets S0-SN into a single, complete payment data set, and sends the complete payment data set to the payment authorization system 216 for payment authorization processing. In at least one embodiment, payment authorization system 216 is identical to payment authorization system 116 (FIG. 1). In another embodiment, the data processing system 204.X or 208 functioning as a merchant data processing system requests the other data processing systems 204.0-204.N to send the payment data subsets S0-SN to the payment authorization system 216. The payment authorization system 216 then combines the payment data subsets S0-SN into a single, complete payment data set and proceeds with the payment authorization processing.

The payment data 203 can be divided into proper subsets of payment data subsets S0-SN in any number of ways. For example, the payment data 203 includes a set of elements that represent values in a payment form presented to a user of the client computer system 202. Exemplary payment data for a credit card holder (also referred to as a "cardholder") includes a cardholder name, a cardholder billing address, a credit card number, credit card security code, credit card expiration month, and credit card expiration year. Other payment data can include a credit card issue month and a card issue year. Assuming that N equals 1, the payment data 203 is bifurcated into two proper payment data subsets S0 and S1 as depicted in Table 1.

TABLE 1

| Payment Data Subset $S_0$ | Payment Data Subset $S_1$ |
|---|---|
| [Billing Address] | [Expiration Month] |
| [Cardholder Name] | [Expiration Year] |
| [Last 4 digits of card number] | [All digits in card number except last 4] |
| [Security Code] | |
| [Issue month] | |
| [Issue Year] | |

Brackets "[ . . . ]" are used in Table 1 to indicate that the bracketed item is a value. Note also that the elements themselves can be subdivided. For example, the credit card number is an element and is subdivided into the last 4 digits in the proper payment data subset $S_0$ and the remaining digits in the proper payment data subset $S_1$.

The payment data subsets $S_0$-$S_N$ are proper data subsets since neither of the payment data subsets $S_0$-$S_N$ contain all of the payment data 203. Additionally, the payment data subsets $S_0$-$S_N$ can be disjoint or non-disjoint. Regarding the division of data and subdivision of elements, in mathematical terms, Payment Data=$\{E_0, E_1, \ldots, E_M\}=\{S_0, S_1, \ldots, S_N\}$, and $E_i=\{e_0, e_1, \ldots, e_T\}$, $S_y$ is selected from the set $E_i$ for all i and T. $E_i$ is an element representing an $i^{th}$ element of the payment data. $e_x$ is the $x^{th}$ sub-element of an element $E_i$. $S_y$ is the $y^{th}$ subset of one or more elements and/or portions of elements of the payment data 203.

The PCI DSS applies to a data processing system when the data processing system has access to a complete set of payment data 203. However, since less than all of the data processing systems 204.0-204.N have access to the combined payment data, the number of data processing systems 204.0-204.N within the compliance scope of PCI DSS is reduced. In at least one embodiment, only one data processing system 204.X has access to the complete set of payment data, only one data processing system 204.X maintains PCI DSS compliance. In at least one embodiment, the data processing system 204.X that maintains PCI DSS compliance can respond to payment requests, combine payment data subsets $S_0$-$S_N$, and send the combined payment data to the payment authorization system 216. In at least one embodiment, data processing system 204.X momentarily combines the payment data subsets $S_0$-$S_N$, thereby minimizing security risks associated with payment data misappropriation. Thus, the data processing system 204.X that maintains PCI DSS compliance can offer PCI DSS compliance as a service to other data processing systems while minimizing exposure of the payment data to misappropriation.

Figure 3:
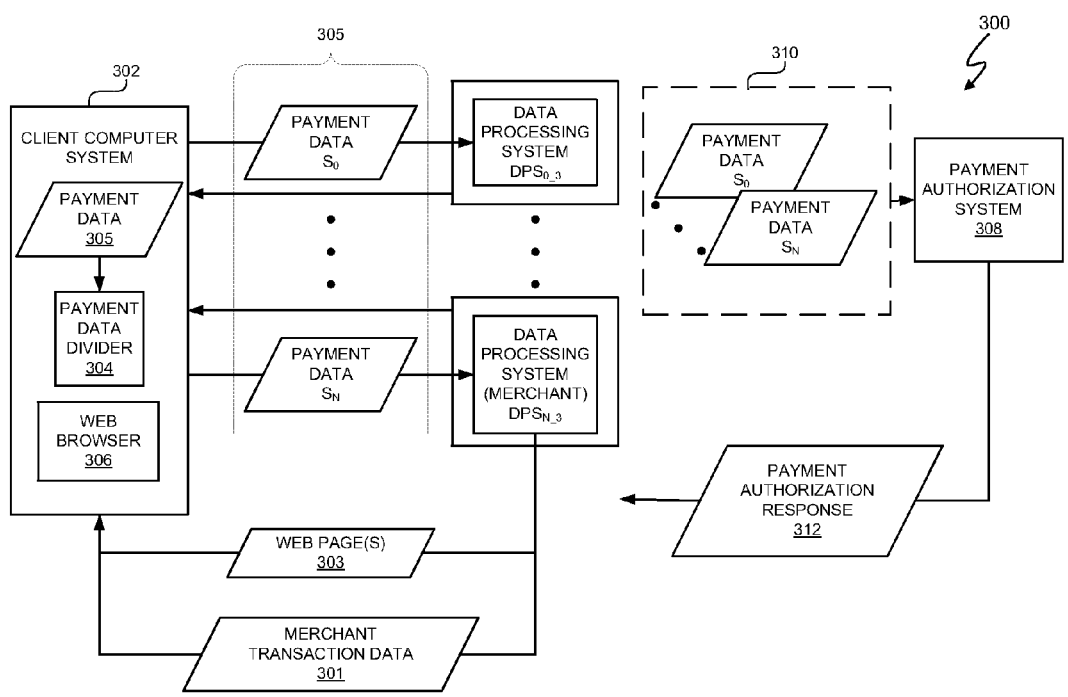
FIG. 3 depicts an ecommerce system, which represents one embodiment of the ecommerce system of FIG. 2.
Figure 4:
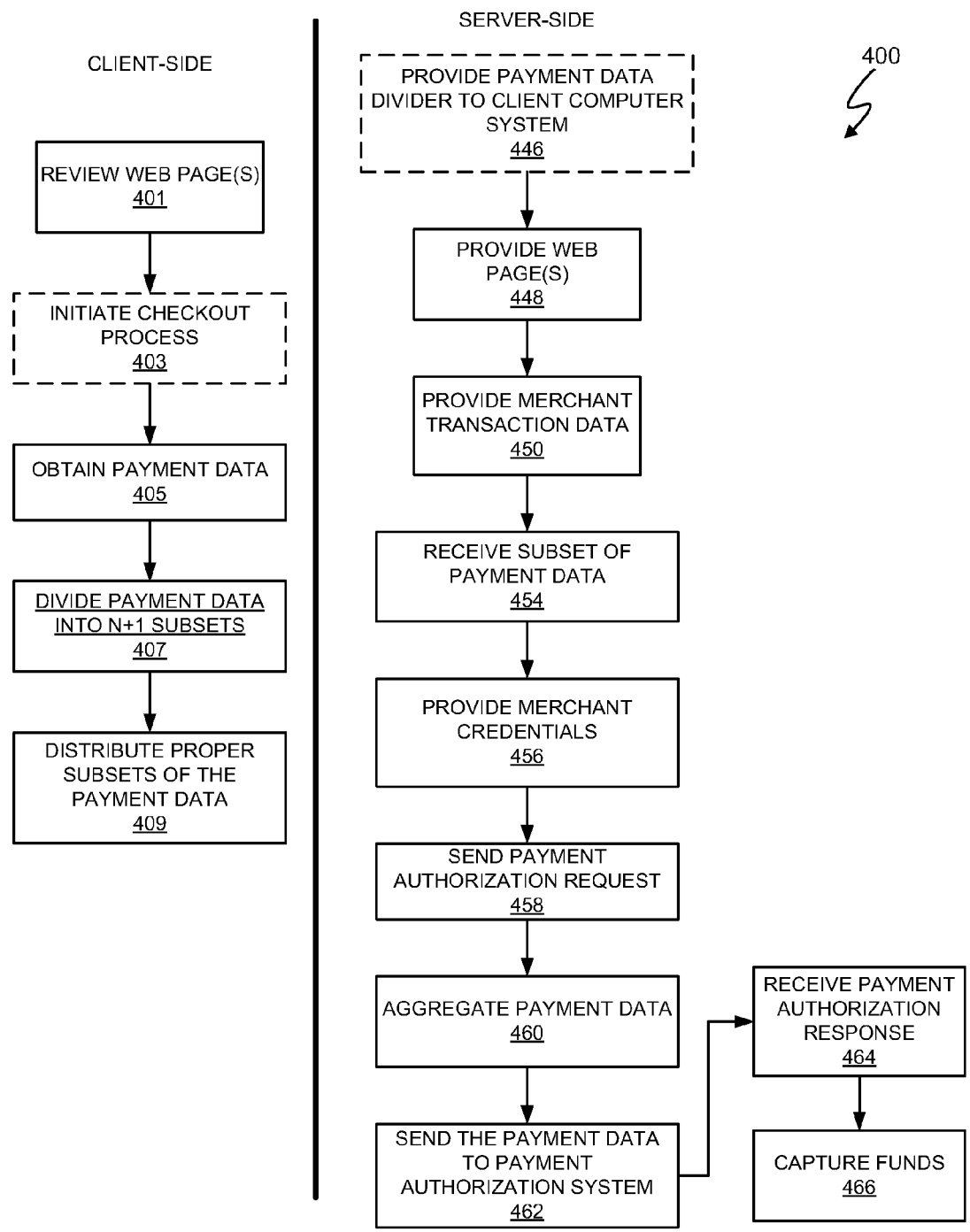
FIG. 4 depicts a payment data division and separation process.

FIG. 3 depicts an ecommerce system 300, which represents one embodiment of the ecommerce system 200. FIG. 4 depicts a payment data division, aggregation, and payment authorization process 400. In at least one embodiment, the ecommerce system 300 operates in accordance with the payment data division, aggregation, and payment authorization process 400.

The ecommerce system 300 includes a client computer system 302 that represents one embodiment of the client computer system 202. The ecommerce system 300 also includes N data processing systems $DPS_{0\_3}$-$DPS_{N\_3}$, which represent respective embodiments of data processing systems 204.0-204.N. N is an integer greater than or equal to 1. In at least one embodiment, the client computer system 302 and data processing systems $DPS_{0\_3}$-$DPS_{N\_3}$ are interconnected via a network such as the network 206 (FIG. 2). Each of the data processing systems $DPS_{0\_3}$-$DPS_{N\_3}$ includes a firewall (depicted as the outer perimeter) so that each of the data processing systems $DPS_{0\_3}$-$DPS_{N\_3}$ is a separate system.

Referring to FIGS. 3 and 4, client computer system 302 includes a payment data divider 304 to read payment data and divide payment data into proper subsets of payment data $S_0$-$S_N$. The particular implementation of the payment data divider 304 is a matter of design choice. The payment data divider 304 can be implemented using, for example, hardware and/or software that can perform hypertext transport protocol (HTTP) functions. In at least one embodiment, the payment data divider 304 is implemented as JavaScript, Visual Basic script, and/or Flash. In at least one embodiment, in operation 446, one of the data processing systems, data processing system $DPS_X$, provides payment data divider 304 to the client computer system 302 for installation in the client computer system 302. The entity and manner of providing the payment data divider 304 to the client computer system 302 is a matter of design choice. In at least one embodiment, the data processing system $DPS_X$ is a third party data processing system that facilitates obtaining payment authorization for a merchant. Operation 446 is depicted in dotted lines because, in at least one embodiment, the payment data divider 304 is installed in the client computer system 302 as part of the web browser 306 or is included by a manufacturer of the client computer system 302.

In at least one embodiment, the data processing system $DPS_{N\_3}$ represents a merchant server system (indicated by the "(MERCHANT)") that provides one or more web pages 303 to the client computer system 302. In operation 448, the merchant data processing system $DPS_{N\_3}$ provides one or more web pages 303 to the client computer system 302. In operation 401, the web browser application 306 of the client computer system 302 renders the web page(s) 303 for display to and review by a user of the client computer system 302. In at least one embodiment, the web page(s) include data to display products, such as goods or services, offered by the merchant data processing system $DPS_{N\_3}$. The user of the client computer system 302 may then decide to enter into a commercial transaction with the merchant for one or more products offered in one or more of the web pages 303 and, in operation 403, initiate a checkout process. Operation 403 is depicted using dotted lines because, as subsequently explained in more detail, in some embodiments, the payment data 305 is divided and transmitted in anticipation of a future commercial transaction rather than in response to a present commercial transaction.

Assuming that the customer and merchant are engaged in a commercial transaction, the customer continues with the check out process in accordance with a checkout process established by the merchant data processing system $DPS_X$. For example, in at least one embodiment, the user initiates a 'buy' request via the web browser 306, and the web browser forwards the 'buy' request to the merchant data processing system $DPS_X$. In operation 405, at least one of the web pages 303 includes a payment form, such as a data entry form or shopping cart, which, in operation 405, allows the client computer system 302 to obtain payment data 305 from the user or from previously stored data for the purchase of one or more products. In at least one embodiment, in operation 450, the merchant data processing system $DPS_{N\_3}$ also sends merchant transaction data 301 to associate the merchant with the payment data 305. The particular content of the merchant transaction data 301 is a matter of design choice. In at least one embodiment, the merchant transaction data 301 includes a merchant identifier, transaction identifier, and a token to associate the payment data 305 with the particular transaction for which the payment data 305 applies. The token allows the client computer system 302 to encrypt the payment data 305. In at least one embodiment, the payment data divider 304 has no ability to store and/or distribute all or part of the payment data subsets $S_0$-$S_N$ without authorization by the user.

The particular event or events that prompt dividing the payment data 305 into the proper subsets of payment data $S_0$-$S_N$ is a matter of design choice. In at least one embodiment, in operation 403, the client computer system 302 divides the subsets of payment data $S_0$-$S_N$ in anticipation of a future commercial transaction with a merchant server system, such as data processing system $DPS_{N\_3}$. In at least one embodiment, in operation 403, the client computer system 302 divides the subsets of payment data $S_0$-$S_N$ for completion of a financial component of the present commercial transaction with the data processing system $DPS_X$.

In operation 407, after obtaining the payment data and upon receipt of an authorization command, such as a 'buy' or 'purchase' command, the payment data divider 304 divides the payment data 305 into the N+1 payment data subsets $S_0$-$S_N$ prior to distributing the payment data subsets $S_0$-$S_N$. An embodiment of operation 407 can be implemented using the following pseudocode:

read values from the payment form fields, such as credit card number, expiration month, expiration year, security code, billing address, cardholder name and issue month and year (if applicable); and parse the payment form fields and divide the payment data 305 into the payment data subsets $S_0$-$S_N$.

In at least one embodiment, the payment data divider 304 includes parsing and division rules that determine how the payment data 305 will be allocated to payment data subsets $S_0$-$S_N$. The particular rules are a matter of design choice. In at least one embodiment, the payment data divider 304 specifies how to divide and allocate the payment data 305 into the payment data subsets $S_0$-$S_N$. In at least one embodiment, the value of N is 1, and the payment data divider 304 bifurcates the payment data 305 into two payment data subsets $S_0$ and $S_1$ as, for example, presented in Table 1.

After dividing the payment data 305 into the payment data subsets $S_0$-$S_N$, in operation 407, the payment data divider 304 distributes the payment data subsets $S_0$-$S_N$ among the data processing systems $DPS_{0\_3}$-$DPS_{N\_3}$ in operation 409. In at least one embodiment, each payment data subset $S_0$-$S_N$ includes transaction identification data. The transaction identification data associates each of the payment data subsets $S_0$-$S_N$ with a particular transaction. In at least one embodiment, the transaction identification data includes data to identify the particular transaction and an identifier of the merchant from which the products are being obtained. When the payment data divider 304 distributes the payment data subsets $S_0$-$S_N$ "among" the data processing systems $DPS_{0\_3}$-$DPS_{N\_3}$, each data processing systems $DPS_{0\_3}$-$DPS_{N\_3}$ receives only part of the payment data subsets $S_0$-$S_N$. In at least one embodiment, the payment data divider 304 utilizes asynchronous JavaScript and XML (AJAX) technology to distribute the payment data subsets $S_0$-$S_N$ to the data processing systems $DPS_{0\_3}$-$DPS_{N\_3}$. Additionally, in at least one embodiment, the payment divider 304 also includes the merchant transaction data 301, or at least a merchant identifier, as part of each of the payment data subsets $S_0$-$S_N$.

In operation 454, each of the data processing systems $DPS_{0\_3}$-$DPS_{N\_3}$ receives a payment data subset. In at least one embodiment, data processing system $DPS_X$ receives payment data subset $S_X$. In at least one embodiment, to protect the data payment subsets $S_0$-$S_N$ from fraudulent use, each of data processing systems $DPS_{0\_3}$-$DPS_{N\_3}$ encrypts and stores one of the respective payment data subsets $S_0$-$S_N$ including the merchant transaction data 301 and a user identifier.

In at least one embodiment, the data processing systems $DPS_{0\_3}$-$DPS_{N\_3}$ do not have the ability to return any or all of the payment data subsets $S_0$-$S_N$ to the client computer system 302. Thus, in at least one embodiment the number of times the payment data subsets $S_0$-$S_N$ are transmitted is minimized.

In operation 456, at least one, and preferably only one, of the data processing systems $DPS_{0\_3}$-$DPS_{N\_3}$ sends merchant credentials to the payment authorization system 308 in order to obtain a payment authorization response 312. In at least one embodiment, the merchant credentials include an identifier that identifies the merchant to at least a payment gateway of the payment authorization system 308. A payment gateway is typically a system that interacts with a payment processor of a bank used by the merchant. The merchant credentials may also include information, such as a password, used to access the payment authorization system 308. In at least one embodiment, the payment authorization system 308 can be any payment authorization system that, for example, electronically authorizes payment. In at least one embodiment, the payment authorization system 308 is identical to the payment authorization system 116 (FIG. 1). A payment authorization request is also sent in operation 458.

Operation 460 aggregates the payment data subsets $S_0$-$S_N$ into an aggregated payment data set 310. The particular system that aggregates the payment data subsets $S_0$-$S_N$ into the payment data set 310 is a matter of design choice. In at least one embodiment, one of the data processing systems $DPS_{0\_3}$-$DPS_{N\_3}$ aggregates the payment data subsets $S_0$. In at least one embodiment, the payment authorization system 308 aggregates the payment data subsets $S_0$-$S_N$ into the payment data set 310. In at least one embodiment, the system that aggregates the payment data subsets $S_0$-$S_N$ into the payment data set 310 comes within the scope of the PCI DSS. However, in at least one embodiment, the other data processing systems that do not have access to the complete payment data 310 are not within the scope of the PCI DSS and, thus, do not incur the costs associated with PCI DSS compliance.

In operation 462, one of the data processing systems $DPS_{0\_3}$-$DPS_{N\_3}$ sends a payment authorization request to the payment authorization system 308. The payment authorization request includes the complete payment data subsets $S_0$-$S_1$, either combined, if aggregated by one of the data processing systems $DPS_{0\_3}$-$DPS_{N\_3}$, or separate, if aggregated by the payment authorization system 308. In at least one embodiment, the payment authorization request also includes the merchant credentials, a transaction amount and currency, and a reference identifier for the merchant, if desired. In at least one embodiment, the payment authorization request is sent using a secure transmission, such as using the HTTPS protocol.

In operation 464, the payment authorization system 308 and at least one of the data processing systems $DPS_{0\_3}$-$DPS_{N\_3}$ receives the payment authorization response 312. In at least one embodiment, upon successful authorization, for security if one of the data processing systems $DPS_{0\_3}$-$DPS_{N\_3}$ has the complete payment data 310, the data processing system $DPS_{0\_3}$-$DPS_{N\_3}$ destroys at least part of the payment data 310, such as the payment data subset.1 in Table 1.

In operation 466, a request by one of the data processing systems $DPS_{0\_3}$-$DPS_{N\_3}$ is made to the payment authorization system 308 to capture the authorized funds to complete the financial component of the commercial transaction.

Embodiments of the payment data division, aggregation, and payment authorization process 400 can also be implemented by a variety of ecommerce system embodiments. The following description includes several exemplary ecommerce system embodiments. It will be understood that other ecommerce systems can also implement the payment data division, aggregation, and payment authorization process 400 and variations thereof.

Figure 5:
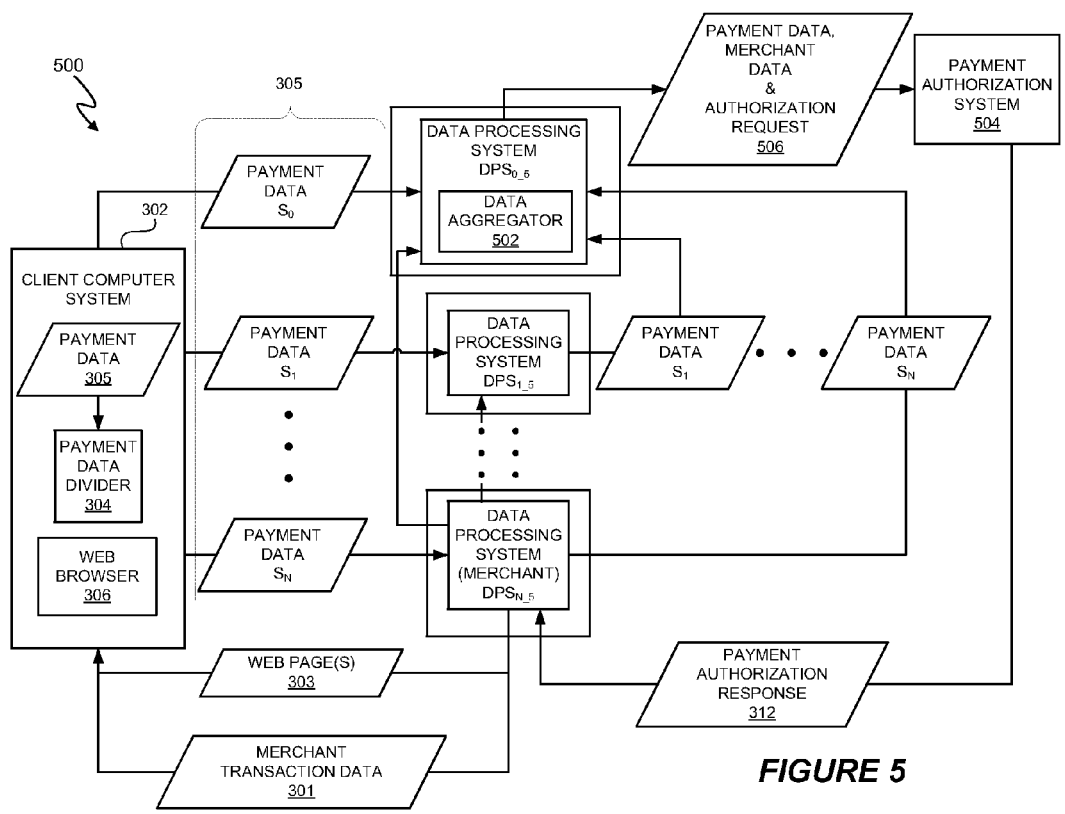
FIG. 5 depicts an ecommerce system, which represents one embodiment of the ecommerce system of FIG. 3.

FIG. 5 depicts ecommerce system 500, which represents one embodiment of ecommerce system 300. The data processing system $DPS_{N\_5}$ represents a merchant data processing system, and the client computer system 302 and the merchant data processing system $DPS_{N\_5}$ conduct a commercial transaction as, for example, described in conjunction with ecommerce system 300. In ecommerce system 500, the payment divider 304 divides the payment data 305 into the payment data subsets $S_0$-$S_1$, encrypts the payment data subsets $S_0$-$S_1$, and distributes the data payment subsets $S_0$-$S_1$ among the data processing systems $DPS_{0\_5}$-$DPS_{N\_5}$.

In at least one embodiment, ecommerce system 500 performs operations 401-409 and 446-454 as previously described. Data processing system $DPS_{0\_5}$ includes a data aggregator 502 that aggregates all of the payment data subsets $S_0$-$S_1$. When the merchant data processing system $DPS_{N\_5}$ is ready to proceed with payment authorization, merchant data processing system $DPS_{N\_5}$ authenticates with data processing system $DPS_{0\_5}$ and sends payment data subset $S_N$ including merchant transaction data to data processing system $DPS_{0\_5}$ with a request to obtain payment authorization from payment authorization system 504 for the transaction identified by the merchant transaction data. The merchant data processing system $DPS_{N\_5}$ also sends a request to all other data processing system $DPS_{1\_5}$-$DPS_{N\_15}$ to send payment data subsets $S_1$-$S_{N-1}$ and merchant transaction data to data processing system $DPS_{0\_5}$.

Since the data processing systems $DPS_{1\_5}$-$DPS_{N\_5}$ only receive respective proper payment data subsets $S_0$-$S_N$, none of the data processing systems $DPS_{1\_5}$-$DPS_{N\_5}$ have access to all of the payment data 305. Accordingly, in at least one embodiment, data processing systems $DPS_{1\_5}$-$DPS_{N\_5}$ are outside the scope of PCI DSS, do not need to comply with PCI DSS standards, and, therefore, save costs associated with PCI DSS implementation and compliance.

The data aggregator 502 decrypts and aggregates (i.e. combines) the payment data subsets $S_0$-$S_N$ into a complete set of payment data. The particular aggregation process of data aggregator 502 is a matter of design choice. In at least one embodiment, the data aggregator 502 performs a reverse process of payment data divider 304 to reassemble the payment data subsets into payment data 305. In at least one embodiment, the data aggregator 502 aggregates the payment data into a format specified by the payment authorization system 504.

In at least one embodiment, the data processing system $DPS_{0\_5}$ processes the merchant transaction data to determine payment gateway account information for the merchant. The data processing system $DPS_{0\_5}$ then sends the combined payment data, merchant data, and an authorization request 506 to the payment authorization system 504 in accordance with the payment gateway account information for the merchant. In at least one embodiment, the merchant data identifies the merchant with a merchant identifier, identifies the transaction with a transaction identifier, and provides merchant account credentials to access the payment authorization system 504. In at least one embodiment, the data 506 also includes a token to be used by the payment authorization system 504 to decrypt the data 506.

Once the payment authorization system 504 receives the data 506, payment authorization system 506 processes the data 506 and generates the payment authorization response 312 as previously described.

Figure 6:
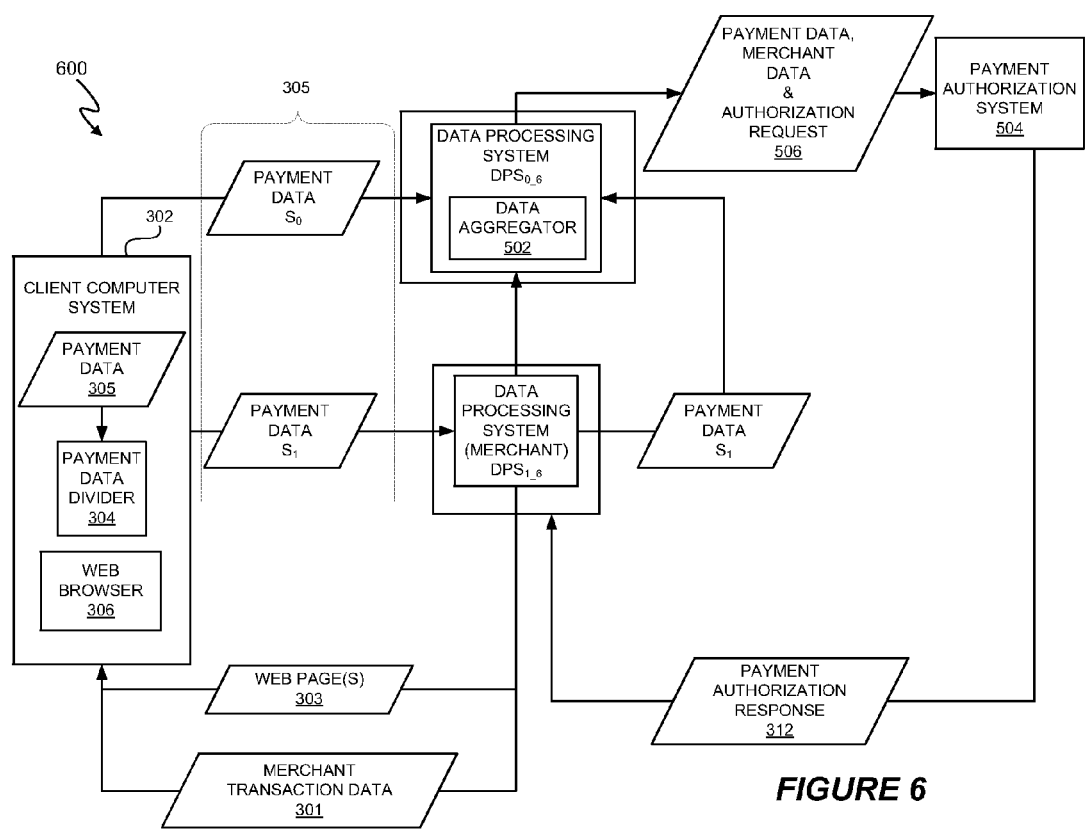
FIG. 6 depicts an ecommerce system, which represents one embodiment of the ecommerce system of FIG. 5.

FIG. 6 depicts ecommerce system 600, which represents one embodiment of ecommerce system 500. Ecommerce system 500 bifurcates the payment data 305 into proper payment data subsets $S_0$ and $S_1$ and distributes the bifurcated payment data subsets to respective data processing system $DPS_{0\_6}$ and merchant data processing system $DPS_{1\_6}$. In at least one embodiment, the payment data 305 is bifurcated as depicted in Table 1. Ecommerce system 600 functions identically to ecommerce system 500 for N=1, except that, in the absence of other data processing systems, the merchant data processing system $DPS_1$ does not request any other data processing systems to send payment data subsets to data processing system $DPS_{0\_6}$.

Figure 7:
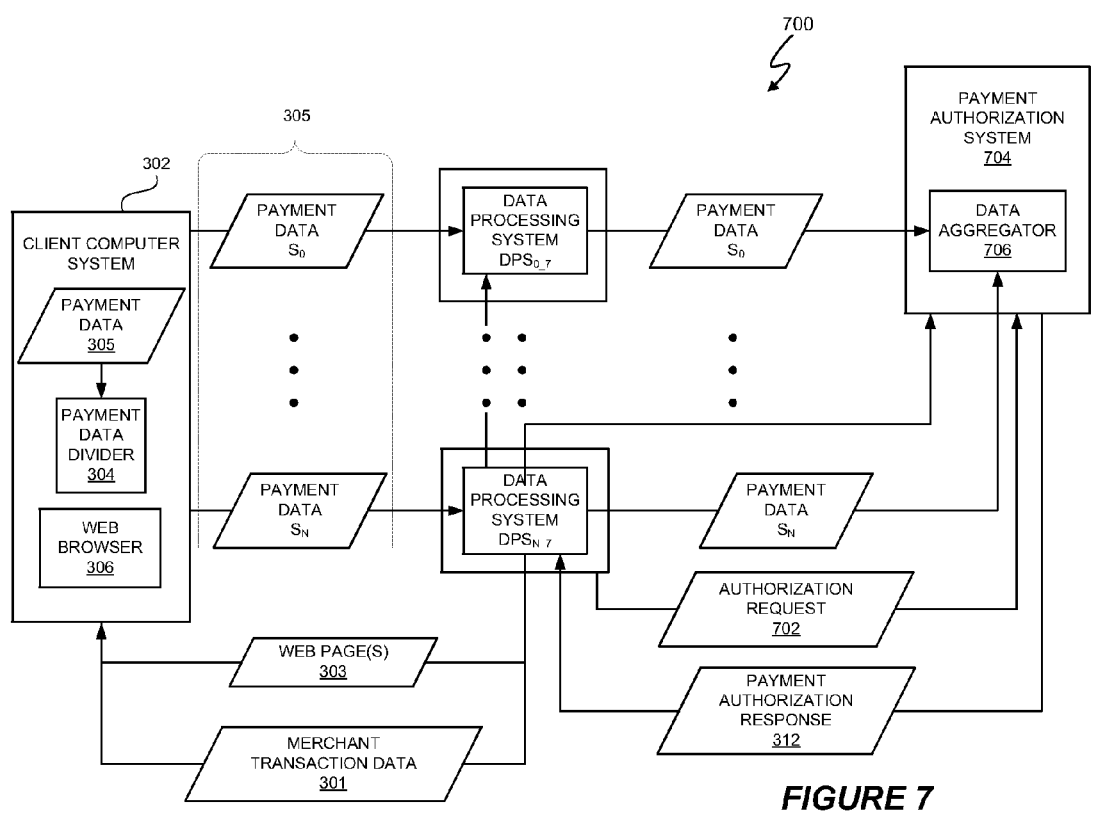
FIG. 7 depicts an ecommerce system, which represents one embodiment of the ecommerce system of FIG. 3.

FIG. 7 depicts ecommerce system 700, which represents one embodiment of ecommerce system 300. In at least one embodiment, ecommerce system 700 performs operations 401-409 and 446-454 of payment data division, aggregation, and payment authorization process 400 as previously described. After the data processing system $DPS_{0\_7}$-$DPS_{N\_7}$ receive respective payment data subsets $S_0$-$S_1$, the data processing system $DPS_{N\_7}$ sends a payment authorization request 702 to the payment authorization system 704 and sends a request to the data processing systems data processing system $DPS_{0\_7}$-$DPS_{N\_7}$ directly data processing system $DPS_{0\_7}$-$DPS_{N\_7}$ to send respective payment data subsets $S_0$-$S_{N-1}$ to payment authorization system 704. Payment authorization system 704 includes data aggregator 706, which combines the payment data subsets $S_0$-$S_1$ to complete payment authorization. In at least one embodiment, the data aggregator 706 combines the payment data subsets $S_0$-$S_N$ as described in conjunction with the data aggregator 502. Once the payment authorization system 704 aggregates the payment data subsets $S_0$-$S_N$, payment authorization system 704 processes the aggregated data and generates the payment authorization response 312 as previously described.

Figure 8:
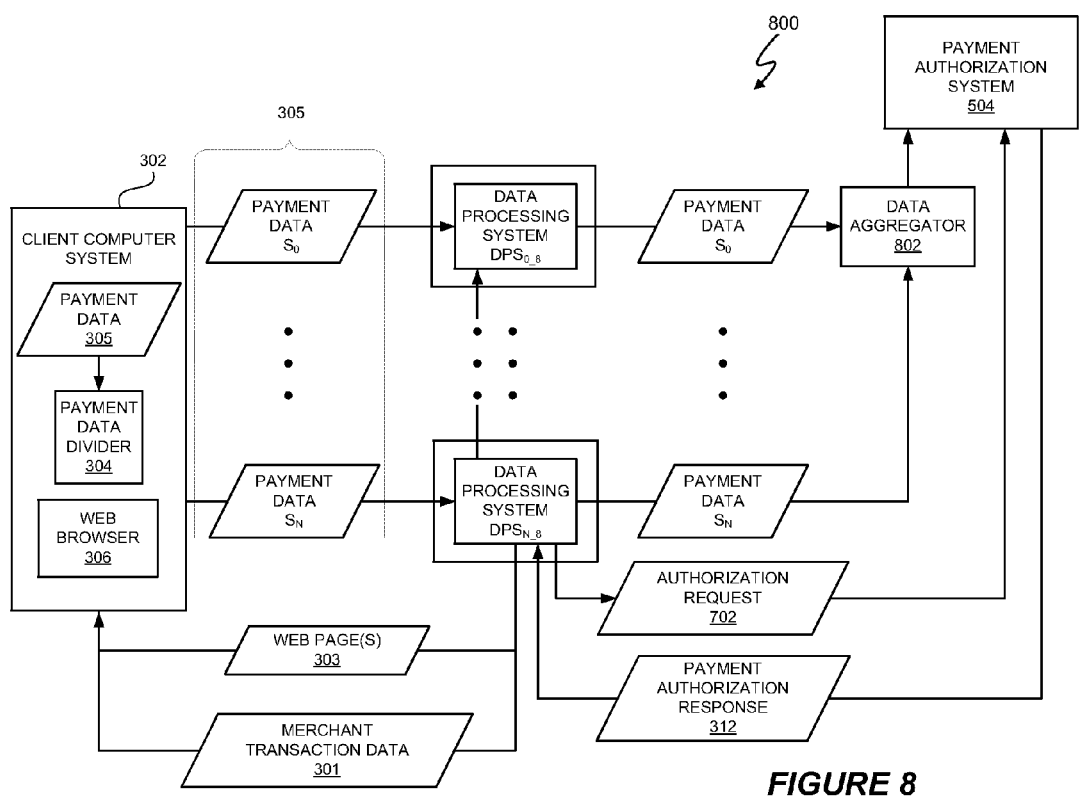
FIG. 8 depicts an ecommerce system, which represents one embodiment of the ecommerce system of FIG. 3.

FIG. 8 depicts ecommerce system 800, which represents one embodiment of ecommerce system 300. In at least one embodiment, ecommerce system 800 functions identically to ecommerce system 700 except that the data aggregator 802 is part of a computer system separate from the payment authorization system 504. In at least one embodiment, the data aggregator 802 combines the payment data subsets $S_0$-$S_N$ as described in conjunction with the data aggregator 502.

Figure 9:
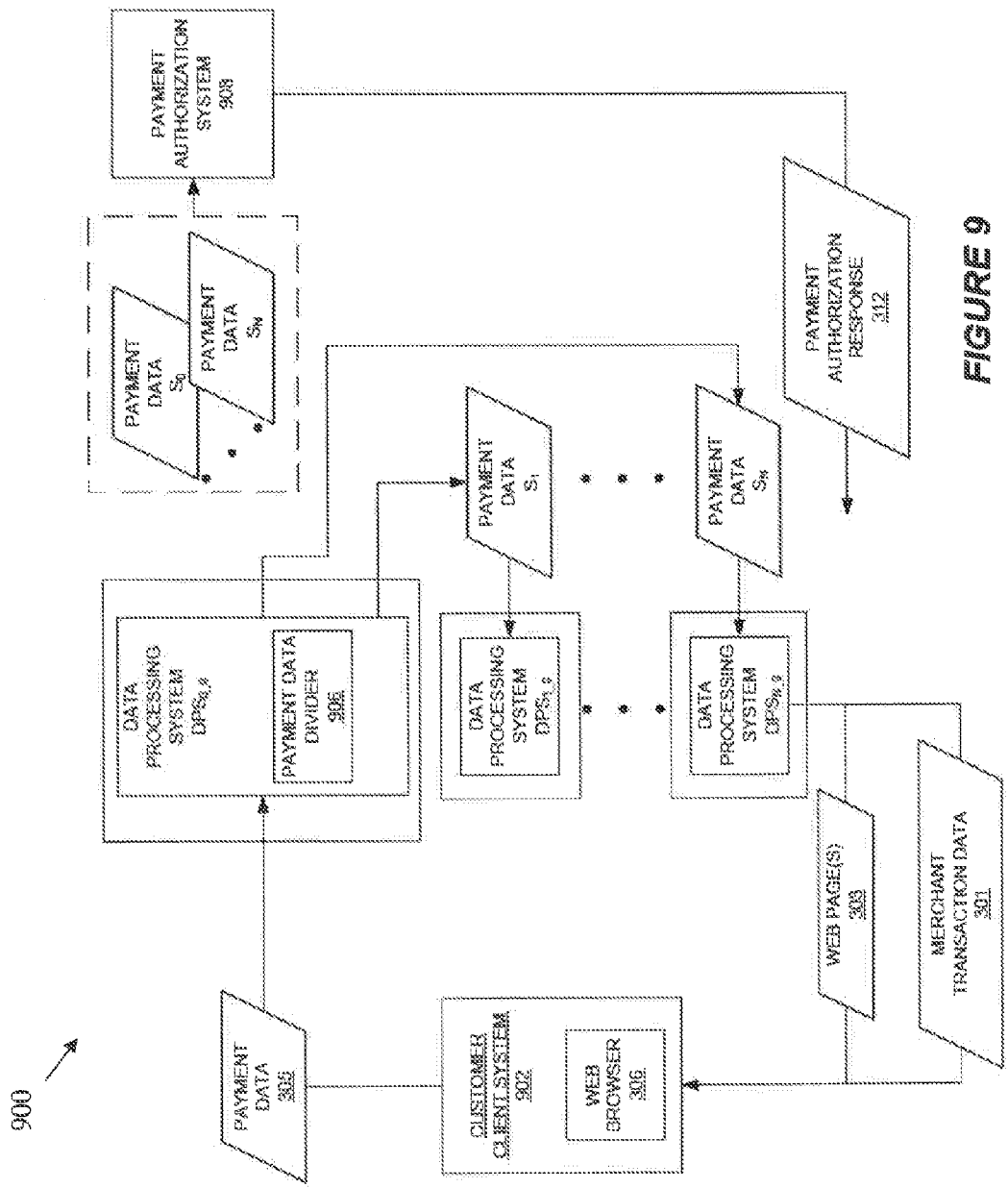
FIG. 9 depicts an ecommerce system, which represents one embodiment of the ecommerce system of FIG. 3.

FIG. 9 depicts ecommerce system 900, which represents one embodiment of ecommerce system 300. The payment data division, aggregation, and payment authorization process 400 operations 401-405 and 446-449 function as previously described. In ecommerce system 900, the client computer system 902 provides the complete payment data 305 to data processing system $DPS_{0\_9}$. The data processing system $DPS_{0\_9}$ system includes a data divider 906. Data divider 906 divides the payment data 305 into proper payment data subsets $S_0$-$S_N$ as, for example, described with respect to payment data divider 304. Data processing system $DPS_0$ then distributes the proper data subsets $S_1$-$S_N$, along with data to identify at least the transaction associated with the payment data subsets $S_1$-$S_N$, to data processing systems $S_1$-$S_N$.

The payment data 305 can be sent to the payment authorization system 908 in any number of ways. For example, in at least one embodiment, data processing system $DPS_{0\_9}$ recombines the payment data subsets $S_0$-$S_1$ and sends the complete data set to payment authorization system 908 for processing, as described in conjunction with ecommerce system 500. In at least one embodiment, each of the data processing systems $DPS_{0\_9}$-$DPS_{N\_9}$ sends the payment data subsets $S_0$-$S_N$ to either a separate payment aggregator or to the payment authorization system 908 as respectively described in conjunction with ecommerce systems 800 and 700. The payment authorization system 908 then generates the payment authorization response 312 as previously described.

Thus, in at least one embodiment of an ecommerce system, payment data from a client computer system is divided into proper subsets and distributed among multiple data processing systems, and each of the data processing systems stores less than all of the subsets of the payment data after the subsets of payment data are distributed and until at least sending the payment data to a payment authorization system for processing.

The client computer systems and data processing systems described herein can be completely hardware implemented using, for example, an application specific integrated circuit(s) implemented using, for example, field programmable gate arrays or other logic circuits. The client computer system and data processing systems can also be implemented using a combination of software and hardware. For example, the client computer system and data processing system can also be implemented as a specifically configured computer system that can perform the processes discussed herein, such as payment data division, aggregation, and payment authorization process 400.

Figure 10:
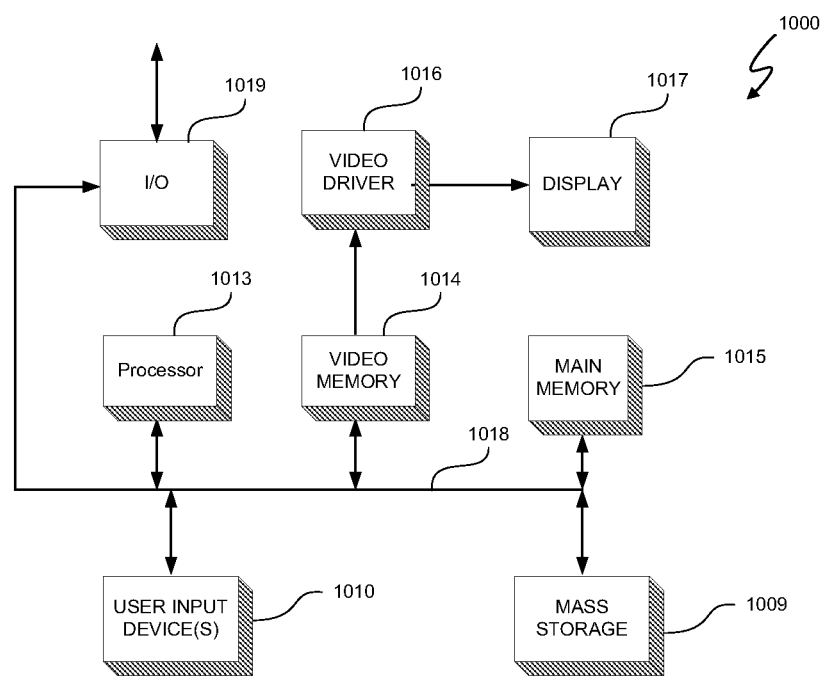
FIG. 10 depicts an exemplary computer system.

FIG. 10 depicts an exemplary computer system 1000, which can represent data processing systems and the client computer systems described herein. The processes discussed herein can also be implemented as code stored in a non-transitory, tangible computer programmable medium and executable by a general purpose or application specific computing system. Examples of a non-transitory, tangible computer programmable medium include hard-drive memories, solid state memories, such as flash memories, compact disks, and digital versatile disks.

Referring to computer system 1000, input user device(s) 1010, such as a keyboard and/or mouse, are coupled to a bi-directional system bus 1018. The input user device(s) 1010 are for introducing user input to the computer system 1000 and communicating that user input to processor 1013. The computer system of FIG. 10 generally also includes a video memory 1014, main memory 1015 and mass storage 1009, all coupled to bi-directional system bus 1018 along with input user device(s) 1010 and processor 1013. The mass storage 1009 may include both fixed and removable media, such as other available mass storage technology. Bus 1018 may contain, for example, 32 or 64 address lines for addressing video memory 1014 or main memory 1015. The system bus 1018 also includes, for example, an n-bit data bus for transferring DATA between and among the components, such as CPU 1009, main memory 1015, video memory 1014 and mass storage 1009, where "n" is, for example, 32 or 64. Alternatively, multiplex data/address lines may be used instead of separate data and address lines.

I/O device(s) 1019 may provide connections to peripheral devices, such as a printer, and may also provide a direct connection to a remote computer system via a telephone link or to the Internet via an ISP. I/O device(s) 1019 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1009 until loaded into main memory 1015 for execution. Computer programs may also be in the form of electronic signals modulated in accordance with the computer program and data communication technology when transferred via a network. Mass storage 1009 and main memory 1015 both are forms of non-transitory storage devices on which executable code can be stored that, when executed by the processor 1013, causes the processor to perform one or more or all of the functions described herein.

The processor 1013, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1015 is comprised of dynamic random access memory (DRAM). Video memory 1014 is a dual-ported video random access memory. One port of the video memory 1014 is coupled to video driver 1016. The video driver 1016 is used to drive the display 1017. Video driver 1016 is well known in the art and may be implemented by any suitable means, This circuitry converts pixel DATA stored in video memory 1014 to a raster signal suitable for use by display 1017. Display 1017 is a type of monitor suitable for displaying graphic images. The computer system 1000 described above is for purposes of example only.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory, computer-readable storage device containing software that, when executed by a processor, causes the processor to:

receive from a client system a first proper subset of a payment data and an identification data of a sender, wherein the first proper subset of the payment data is one of a plurality of proper subsets of the payment data associated with a commercial transaction between a sender and a merchant;

generate a transaction identification code to associate the first proper subset of the payment data with the sender;

send the transaction identification code to the client system to identify one or more other proper subsets of the payment data with the sender;

aggregate the one or more other proper subsets of the payment data from other data processing systems with the first proper subset; and transmit a request for payment authorization for the commercial transaction, the request including aggregated proper subsets of the payment data, a merchant credential, and a transaction amount.

2. A method comprising:

receiving from a client system a first proper subset of a payment data and an identification data of a sender, wherein the first proper subset of the payment data is one of a plurality of proper subsets of the payment data associated with a commercial transaction between a sender and a merchant;

generating, by a processor, a transaction identification code to associate the first proper subset of the payment data with the sender;

sending the transaction identification code to the client system to identify one or more other proper subsets of the payment data with the sender;

aggregating, by the processor, the one or more proper subsets of the payment data from other data processing systems with the first proper subset; and transmitting a request for payment authorization for the commercial transaction, the request including aggregated proper subsets of the payment data, a merchant credential, and a transaction amount.

3. The method of claim 2, wherein at least a second proper subset of the payment data is received from a second client system.

4. The method of claim 2, wherein the payment data comprises multiple payment data elements including at least two of a credit card number, a cardholder name, a cardholder billing address, a card security code, a card issue month, a card issue year, a card expiration month, and a card expiration year.

5. The method of claim 2, wherein the first proper subset of the payment data comprises at least one payment data element, and wherein each subsequent proper subset of the payment data comprises at least one different payment data element respectively.

6. The method of claim 2, wherein the identification data of the sender comprises an access token.

7. The method of claim 2, wherein the client system from which the first proper subset of the payment data is received has some, but not all, of the payment data.

8. The method of claim 2, wherein no single proper subset of the payment data received is sufficient to complete the commercial transaction.

9. The method of claim 2, wherein the first proper subset of the payment data is received in an encrypted form.

10. A non-transitory computer readable storage medium comprising instructions that, when executed by a processor, cause the processor to:

receive from a client system a first proper subset of a payment data and an identification data of a sender, wherein the first proper subset of the payment data is one of a plurality of proper subsets of the payment data associated with a commercial transaction between a sender and a merchant;

generate a transaction identification code to associate the first proper subset of the payment data with the sender;

send the transaction identification code to the client system to identify one or more other proper subsets of the payment data with the sender;

aggregate the one or more proper subsets of the payment data from other data processing systems with the first proper subset; and transmit a request for payment authorization for the commercial transaction, the request including aggregated proper subsets of the payment data, a merchant credential, and a transaction amount.

11. The non-transitory computer readable storage medium of claim 10, wherein each proper subset of the payment data received from the client system is encrypted, wherein no single proper subset of the payment data is sufficient to complete the commercial transaction, and wherein proper subsets of the payment data are received from at least two client systems to complete the commercial transaction.

12. The non-transitory computer readable storage medium of claim 10, wherein the payment data comprises payment data elements including at least two of a credit card number, a cardholder name, a cardholder billing address, a card security code, a card issue month, a card issue year, a card expiration month, and a card expiration year.

13. The non-transitory computer readable storage medium of claim 10, wherein each proper subset received from the client system comprises at least one of the payment data elements, and wherein each of the payment data elements exists in only one proper subset.

14. A system comprising:
a processor; and
a memory comprising computer-executable instructions that when executed by the processor, cause the processor to:

receive from a client system a first proper subset of a payment data and an identification data of a sender, wherein the first proper subset of the payment data is one of a plurality of proper subsets of the payment data associated with a commercial transaction between a sender and a merchant;

generate a transaction identification code to associate the first proper subset of the payment data with the sender;

send the transaction identification code to the client system to identify one or more other proper subsets of the payment data with the sender;

aggregate the one or more proper subsets of the payment data from other data processing systems with the first proper subset; and transmit a request for payment authorization for the commercial transaction, the request including aggregated proper subsets of the payment data, a merchant credential, and a transaction amount.

15. The system of claim 14, wherein the computer-executable instructions further comprise maintaining by requiring a plurality of proper subsets of the payment data needed to complete the commercial transaction to be received from a plurality of client systems such that no individual client system has a sufficient portion of the payment data to complete the commercial transaction.

16. The system of claim 14, wherein each proper subset of payment data includes at least one payment data element comprising a credit card number, a cardholder name, a cardholder billing address, a card security code, a card issue month, a card issue year, a card expiration month, and a card expiration year, wherein no two proper subsets of payment data contain duplicate payment data elements, and wherein at least two proper subsets of payment data are required to complete the commercial transaction.

17. The system of claim 14, wherein the computer-executable instructions further comprise:

maintaining the proper subsets of payment data are aggregated to form a complete payment data needed to complete the commercial transaction; and transmitting with a payment authorization request to a payment authorization system.

18. The system of claim 14, wherein each proper subset of the payment data includes a transaction identifier that associates the subset with a particular commercial transaction.

* * * * *